L. P. HALLADAY.
CLAMP FOR AUTOMOBILE BUMPERS.
APPLICATION FILED NOV. 5, 1919.
1,344,797.
Patented June 29, 1920.
2 SHEETS—SHEET 1.
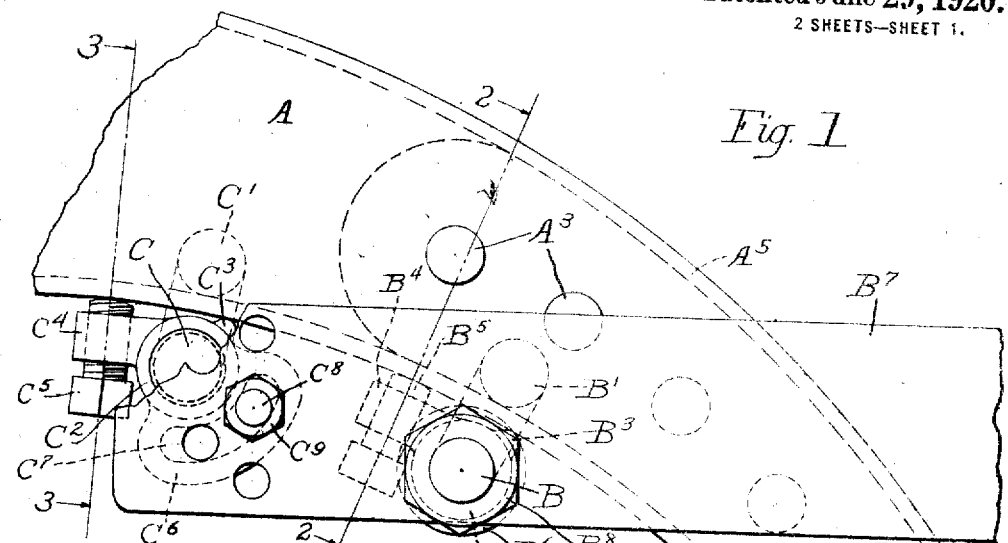
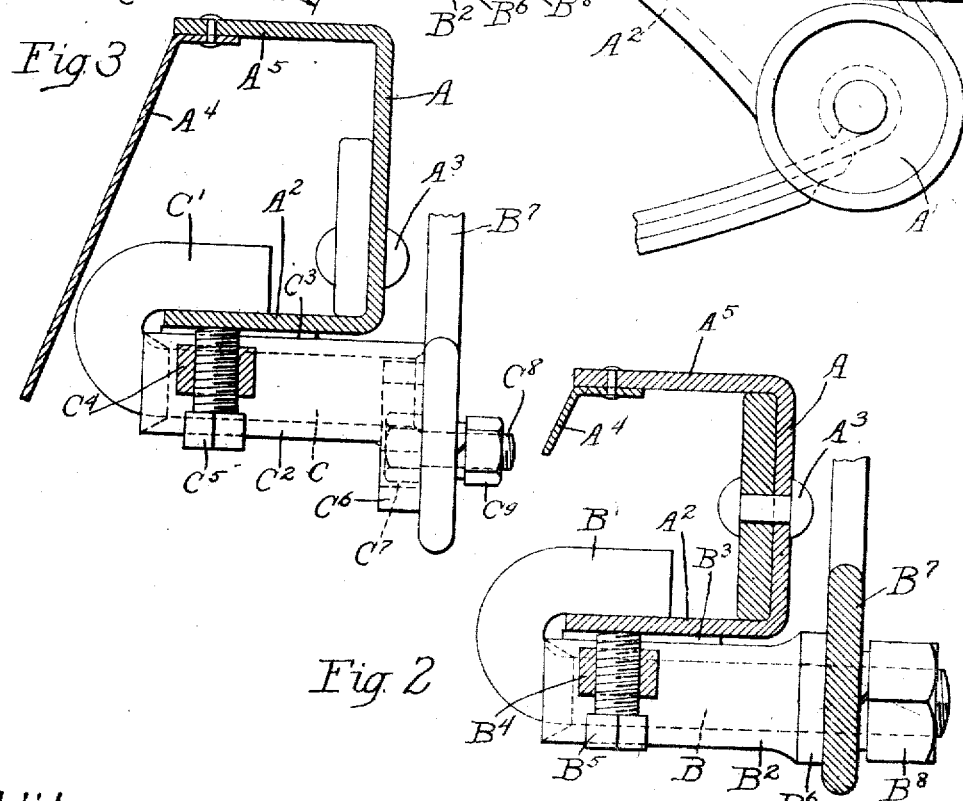
Witness
Edward T. Wray.
Inventor
Lewis P. Halladay
by Perks & Curts
Attorneys

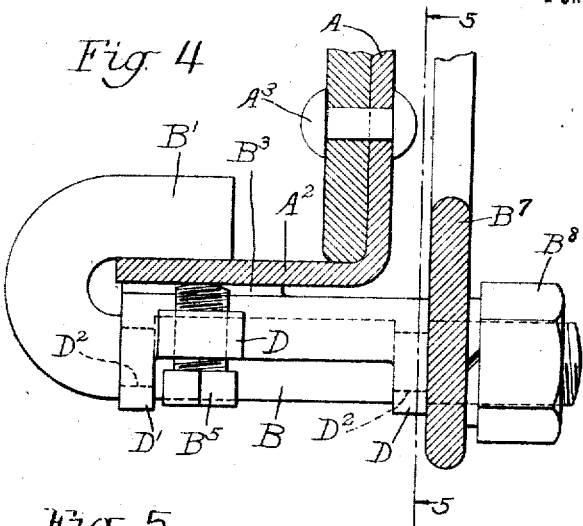
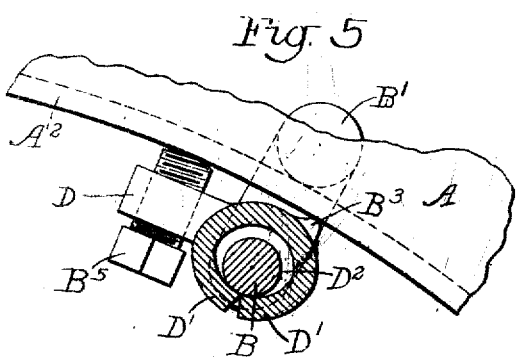
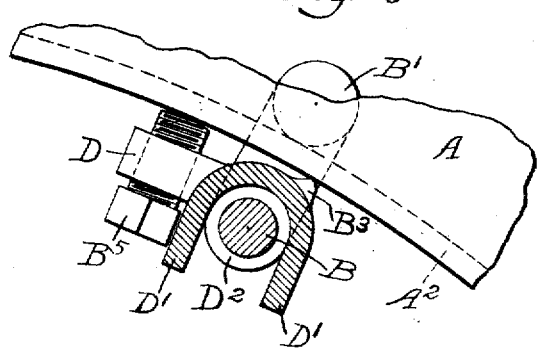

UNITED STATES PATENT OFFICE.

LEWIS P. HALLADAY, OF STREATOR, ILLINOIS.

CLAMP FOR AUTOMOBILE-BUMPERS.

1,344,797.

Specification of Letters Patent.

Patented June 29, 1920.

Application filed November 5, 1919. Serial No. 335,859.

*To all whom it may concern:*

Be it known that I, LEWIS P. HALLADAY, a citizen of the United States, residing at Streator, in the county of La Salle and State of Illinois, have invented a certain new and useful Improvement in Clamps for Automobile-Bumpers, of which the following is a specification.

My invention relates to clamps for automobile bumpers and has for one object to provide a new and improved form of clamp which can be used to hold an automobile bumper to the frame. One particular object of my invention is to provide a clamp which may be used on those automobiles which have a splash apron extending across between the frame arms making it necessary to attach the bumper by means engaging only to the lower flange of the frame. Such splash aprons frequently come very near to the frame and it becomes necessary to have a holding clamp which does not project very far out beyond the edge of the flange. It is also necessary to provide means for holding the member which extends back from the bumper applied to one side of the frame member so as to clear any engagements or rivet heads projecting from the side of the frame and my apparatus is peculiarly well adapted to carry out this purpose. Many efforts have been made to solve the problem by means of hooks and bolts which are tightened up longitudinally against the frame or which rely for holding power upon the stiffness of the flange at a point removed from the body of the frame. Such apparatuses are always of doubtful strength because when overloaded, they may cause even a slight bend in the unsupported flange edge and this results in inequality and looseness. By my arrangement, I provide a clamping action of the parts extending substantially clear across the flange from the body of the frame outwardly and thus it is necessary to tear away the entire flange to disconnect my hook and even that would not release the hold of my clamp or hook on the flange itself.

Another characteristic of my invention is that the holding of the clamp on the frame is altogether independent of the holding of the bumper on the clamp and the clamp may be adjusted in position on the frame and locked in place before the bumper itself is attached. This is of great importance as it enables easy and convenient handling of the parts and gives the operator rigid support when the bumper may be subsequently attached.

My invention is illustrated more or less diagrammatically in the accompanying drawings wherein:

Figure 1 is a side elevation of one of the front frame horns of an automobile showing my apparatus in place;

Fig. 2 is a section along the line 2—2 of Fig. 1;

Fig. 3 is a section along the line 3—3 of Fig. 1;

Fig. 4 is a detail section similar to Fig. 2 of a modified form of clamp;

Fig. 5 is a detail section at the line 5—5 of Fig. 4;

Fig. 6 is a detail section similar to Fig. 5 showing the clamp before the assembly is complete.

Like parts are indicated by like characters throughout the drawings.

A is the front extremity of the usual type of channel shaped automobile frame, having the usual spring bolt eye $A^1$, and flange $A^2$. $A^3$ is the head of a rivet adapted to hold the spring bolt eye $A^1$ in place at the forward end of the frame. $A^4$ is a splash apron riveted to the upper frame flange $A^5$ and extending down along side of the lower, there being but little clearance between it and the edge of the lower flange.

In my preferred form, I provide two different clamping members operating in exactly the same way so far as their clamping is concerned, but engaging the bumper itself, in a slightly different manner for the front and the rear clamp, though under some conditions, the same clamp might be used for both the front and the rear.

Referring first to the front clamp, it is made up of the screw threaded shank B, terminating in a hook end $B^1$, bent back into parallelism with the shank. $B^2$ is a sleeve rotatably mounted on the shank B and having a projecting clamping edge $B^3$ extending substantially throughout its length and adapted to engage the under side of the flange $A^2$. Projecting outwardly from the opposed side of the sleeve $B^2$ is a lever arm $B^4$ in which is screw threaded set screw $B^5$ which is adapted also to engage the under side of the flange A². The arrangement of the parts is such that when the hook is hooked over the flange and the set screw is rotated to tighten it, the clamping part B³ and the set screw both engage the under side of the frame and the hook B¹ engages the upper side, and we get a very rigid and powerful lever action which rigidly holds and fastens the clamp on the flange. The sleeve B is upset as at B⁶ to furnish an abutment and bearing surface for the forwardly extending bumper supporting bar B⁷ which is held thereby out of contact with the automobile frame and clear of the rivet A³. It will be noted that the inner end of the sleeve engages the bight of the hook so that tightening up of the nut B⁸ to seat the bumper supporting bar B⁷ against the up-set end of the sleeve B⁶ does not in any way disturb the relation between the clamping members. Thus the clamping is complete and not interfered with by the positioning of the bumper and since the bumper must be rotated into the proper position, the nut can be left loose and there will still be a firm and permanent pivot support about which such adjusting rotation can take place.

Referring now to the rear clamp: C is a stub end shank provided with a hook C¹ similar to the hook B¹. The difference is that this stub end shank does not extend outwardly beyond the sleeve C². This sleeve C² is provided with a projecting clamping member C³ adapted to engage the frame and on the other side with a lever arm C⁴ in which is screw threaded the set screw C⁵. Downwardly extending from the sleeve C² is an arm or flange C⁶ slotted as at C⁷. It is adapted to engage the end B⁷ of the bumper supporting bar which has at least one, and may have a plurality of perforations therethrough, and a bolt and nut C⁸—C⁹ adapted to fasten the bumper supporting bar in adjustable position, the bolt being free to move up and down and laterally for adjustment in the curved slot. The shank C and sleeve C² may be held against relative longitudinal movement, if that be desired by for instance, upsetting the end of the shank C or by any other suitable well-known means but this is only necessary to hold the parts together for shipment, because once the set screw is tightened up, the clamping force is so great that there is no possibility of any lateral movement of the parts.

In the modified form shown in Fig. 4, I have shown a lever D, preferably a drop forging having downwardly extending ears D¹—D¹ to engage the shank adapted to be bent down over it after assembly. In this case, the shank is grooved as at D² to engage these ears, thus preventing longitudinal movement, the idea being that these ears merely hold the parts together for assembly but do not carry any of the working strain because the clamping lever action is so great that the parts cannot possibly be displaced.

It will be evident that I have shown in my drawings an operative device, still many changes might be made in size, shape, and arrangement of parts without departing materially from the spirit of my invention, and I wish therefore, that my drawings be regarded as in a sense, diagrammatic.

The use and operation of my invention are as follows:

The U shaped clamping member is rotated in a horizontal plane through an angle of 90 degrees from the position shown in Figs. 1, 2, and 3 so that the upper shank or arm of the U can pass in between the splash pan and the lower frame flange. It is then rotated into the position shown in the drawings and the sleeve is slipped through the shank, or this is done with the sleeve in place if that is desirable or if the sleeve is permanently attached to the shank. The operator then moves the clamp along the frame to the desired or proper position and screws up the set screw, thus bringing the cutting, contacting edge on one side of the sleeve and the cup shaped edge of the set screw on the other side of the sleeve both into engagement with the under side of the frame flange.

Because the cutting or clamping edge extends throughout substantially the entire length of the sleeve and thus engages the frame flange throughout almost its entire width, there is a firm and even elongated contact preventing rocking of the clamp in a plane perpendicular to the frame. Because the lever arm in which the set screw is operated is longer than the lever arm carrying the cutting clamping edge, the set screw, even if relatively light pressure is applied thereto, will give a very heavy pressure at the cutting or clamping edge thus drawing the upper arm of the U and the cutting or clamping edge very rigidly together, and a very powerful hold is thus obtained. The bumper supporting bar is then pivoted on the forward clamp and loosely attached thereto. The rear clamp is then put in place in exactly the same way as the forward one and the bumper bar is moved up and down with the nut and bolt sliding in the slot on the rear clamp to give the proper adjustment or if it is desired to use the same kind of a clamp for the rear as for the front, then a bumper supporting bar will be provided with a plurality of adjusting holes and the operator will select which ever one of the holes he prefers and pass the shank through that hole and tighten up the bar thus giving the proper adjustment and locking the supporting bar in place.

I have shown my clamp as applied directly to the flange of an automobile frame. Obviously, of course, the clamp would work in exactly the same way if applied to the body of the frame or any flat member whether flanged or not and clearly, little if any rearrangement would be required to provide for gripping the body of the frame without engaging the flange at all.

I have shown a clamping member which engages the frame at one point, that is to say, one arm of the U shaped member has a line contact with the frame or flange throughout a large part of its length. The lever or cam, because my lever is nothing more or less in its broad statement, than a cam, provides the other two necessary points of contact with the frame in that the cutting edge near the fulcrum engages the frame throughout a considerable extent and the set screw or other cam rotating means engages the frame at one separate and restricted point only.

The three points of contact are in actual practice ordinarily necessary because while you can tighten up the clamp with but two points, it is much more satisfactory and gives a much more rigid and permanent hold if the frame is gripped at one place on one side and two places on the opposed side.

In some places, I have talked about a U bolt. My clamping member is in a very real sense, a U bolt in both Figs. 2 and 3. It is made of a single piece of bolt or bar stock bent in the form of a U. In the form shown in Fig. 2, it is threaded at one end, and in the form shown in Fig. 3, it is not, but in both cases it can properly be referred to as a U bolt.

I claim:

1. A clamp for automobile bumpers and the like comprising a clamping member adapted to engage one side of the frame, a lever, a connection between it and the clamping member, and means for rocking it to grip the flange between it and the clamping member.

2. A clamp for automobile bumpers and the like comprising a clamping member adapted to engage one side of the frame, a cam, a connection between it and the clamping member, and means for rocking it to grip the frame between it and the clamping member.

3. A clamp for automobile bumpers and the like comprising a clamping member adapted to engage one side of the frame, a lever, a connection between it and the clamping member, and means for rocking it to grip the flange between it and the clamping member, the rocking means comprising a set screw adapted to engage the frame.

4. A clamp for automobile bumpers and the like comprising a clamping member adapted to engage one side of the frame, a cam, a connection between it and the clamping member, and means for rocking it to grip the frame between it and the clamping member, the rocking means comprising a set screw adapted to engage the frame.

5. A clamp for automobile bumpers and the like comprising a clamping member adapted to engage one side of the frame, a lever, a connection between it and the clamping member, and means for rocking it to grip the flange between it and the clamping member, the lever being provided with an elongated sharpened frame engaging edge adjacent its fulcrum, the lever rocking means being farther removed from the fulcrum than the frame engaging edge.

6. A clamp for automobile bumpers and the like comprising a clamping member adapted to engage one side of the frame, a lever, a connection between it and the clamping member, and means for rocking it to grip the flange between it and the clamping member, the rocking means comprising a set screw adapted to engage the frame, the lever being provided with an elongated sharpened frame engaging edge adjacent its fulcrum, the lever rocking means being farther removed from the fulcrum than the frame engaging edge.

7. A clamp for automobile bumpers and the like comprising a clamping member adapted to engage one side of the frame, a lever, a connection between it and the clamping member, and means for rocking it to grip the flange between it and the clamping member, and means independent of the clamping means for attaching an automobile bumper to said clamp.

8. A clamp for automobile bumpers and the like comprising a clamping member adapted to engage one side of the frame, a cam, a connection between it and the clamping member, and means for rocking it to grip the frame between it and the clamping member, and means independent of the clamping means for attaching an automobile bumper to said clamp.

9. A clamp for automobile bumpers and the like comprising a clamping member adapted to engage one side of the frame, a lever, a connection between it and the clamping member, and means for rocking it to grip the flange between it and the clamping member, the rocking means comprising a set screw adapted to engage the frame, and means independent of the clamping means for attaching an automobile bumper to said clamp.

10. A clamp for automobile bumpers and the like comprising a clamping member adapted to engage one side of the frame, a cam, a connection between it and the clamping member, and means for rocking it to grip the frame between it and the clamping member, the rocking means comprising a set screw adapted to engage the frame, and means independent of the clamping means for attaching an automobile bumper to said clamp.

11. A clamp for automobile bumpers and the like comprising a clamping member adapted to engage one side of the frame, a lever, a connection between it and the clamping member, and means for rocking it to grip the flange between it and the clamping member, the lever being provided with an elongated sharpened frame engaging edge adjacent its fulcrum, the lever rocking means being farther removed from the fulcrum than the frame engaging edge, and means independent of the clamping means for attaching an automobile bumper to said clamp.

12. A clamp for automobile bumpers and the like comprising a clamping member adapted to engage one side of the frame, a lever, a connection between it and the clamping member, and means for rocking it to grip the flange between it and the clamping member, the rocking means comprising a set screw adapted to engage the frame, the lever being provided with an elongated sharpened frame engaging edge adjacent its fulcrum, the lever rocking means being farther removed from the fulcrum than the frame engaging edge, and means independent of the clamping means for attaching an automobile bumper to said clamp.

13. A clamp comprising a hook bolt adapted to inclose one flange of a frame member, a lever mounted on one arm of the bolt and means for rocking it to clamp the flange between it and the other arm.

14. A clamp comprising a hook bolt adapted to inclose one flange of a frame member, a cam mounted on one arm of the bolt and means for rocking it to clamp the flange between it and the other arm.

15. A clamp comprising a hook bolt adapted to inclose one flange of a frame member, a lever mounted on one arm of the bolt and means for rocking it to clamp the flange between it and the other arm, the rocking means comprising a set screw adapted to engage the frame.

16. A clamp comprising a hook bolt adapted to inclose one flange of a frame member, a cam mounted on one arm of the bolt and means for rocking it to clamp the flange between it and the other arm, the rocking means comprising a set screw adapted to engage the frame.

17. A clamp comprising a hook bolt adapted to inclose one flange of a frame member, a lever mounted on one arm of the bolt and means for rocking it to clamp the flange between it and the other arm, the lever being provided with an elongated sharpened frame engaging edge adjacent its fulcrum, the lever rocking means being farther removed from the fulcrum than the frame engaging edge.

18. A clamp comprising a hook bolt adapted to inclose one flange of a frame member, a lever mounted on one arm of the bolt and means for rocking it to clamp the flange between it and the other arm, the rocking means comprising a set screw adapted to engage the frame, the lever being provided with an elongated sharpened frame engaging edge adjacent its fulcrum, the lever rocking means being farther removed from the fulcrum than the frame engaging edge.

19. A clamp comprising a hook bolt adapted to inclose one flange of a frame member, a lever mounted on one arm of the bolt and means for rocking it to clamp the flange between it and the other arm, and means independent of the clamping means for attaching an automobile bumper to said bolt.

20. A clamp comprising a hook bolt adapted to inclose one flange of a frame member, a cam mounted on one arm of the bolt and means for rocking it to clamp the flange between it and the other arm, and means independent of the clamping means for attaching an automobile bumper to said bolt.

21. A clamp comprising a hook bolt adapted to inclose one flange of a frame member, a lever mounted on one arm of the bolt and means for rocking it to clamp the flange between it and the other arm, the rocking means comprising a set screw adapted to engage the flange, and means independent of the clamping means for attaching an automobile bumper to said bolt.

22. A clamp comprising a hook bolt adapted to inclose one flange of a frame member, a cam mounted on one arm of the bolt and means for rocking it to clamp the flange between it and the other arm, the rocking means comprising a set screw adapted to engage the flange, and means independent of the clamping means for attaching an automobile bumper to said bolt.

23. A clamp comprising a hook bolt adapted to inclose the edge of a frame member, a lever mounted on one arm of the bolt and means for rocking it to clamp the frame between it and the other arm, the lever being provided with an elongated sharpened frame engaging edge adjacent its fulcrum, the lever rocking means being farther removed from the fulcrum than the frame engaging edge, and means independent of the clamping means for attaching an automobile bumper to said bolt.

24. A clamp comprising a hook bolt adapted to inclose the edge of a frame member, a lever mounted on one arm of the bolt and means for rocking it to clamp the frame between it and the other arm, the rocking means comprising a set screw adapted to engage the frame, the lever being provided with an elongated sharpened frame engaging edge adjacent its fulcrum, the lever rocking means being farther removed from the fulcrum than the frame engaging edge, and means independent of the clamping means for attaching an automobile bumper to said bolt.

25. A clamp comprising a hook bolt adapted to inclose one flange of a frame member, a sleeve mounted for rotation thereon and having an eccentric frame engaging projection adapted when rotated to engage the flange to clamp the opposed arm of the bolt against the opposed side thereof, and means for rotating the sleeve.

26. A clamp comprising a hook bolt adapted to inclose one flange of a frame member, a sleeve mounted for rotation thereon and having an eccentric frame engaging projection adapted when rotated to engage the flange to clamp the opposed arm of the bolt against the opposed side thereof, and means for rotating the sleeve, said means comprising an arm projecting from the sleeve, a set screw, screw threaded therein adapted to engage the flange.

27. A clamp comprising a hook bolt adapted to inclose one flange of a frame member, a sleeve mounted for rotation thereon and having an eccentric frame engaging projection adapted when rotated to engage the flange to clamp the opposed arm of the bolt against the opposed side thereof and means for rotating the sleeve, the end of the sleeve being laterally extended, and means for clamping the bumper support to such laterally extended end.

28. A clamp comprising a hook bolt adapted to inclose one flange of a frame member, a sleeve mounted for rotation thereon and having an eccentric frame engaging projection adapted when rotated to engage the flange to clamp the opposed arm of the bolt against the opposed side thereof, and means for rotating the sleeve said means comprising an arm projecting from the sleeve, a set screw, screw threaded therein adapted to engage the flange, the end of the sleeve being laterally extended, and means for clamping the bumper support to such laterally extended end.

29. A clamp comprising a hook bolt adapted to inclose one flange of a frame member, a sleeve mounted for rotation thereon and having an eccentric frame engaging projection adapted when rotated to engage the flange to clamp the opposed arm of the bolt against the opposed side thereof and means for rotating the sleeve, the end of the sleeve being laterally extended, and means for clamping the bumper support to such laterally extended end, said clamping means comprising a nut screw threaded on the end of the bolt adapted to compress the bumper support against the laterally extended end of the flange.

30. A clamp comprising a hook bolt adapted to inclose one flange of a frame member, a sleeve mounted for rotation thereon and having an eccentric frame engaging projection adapted when rotated to engage the flange to clamp the opposed arm of the bolt against the opposed side thereof, and means for rotating the sleeves said means comprising an arm projecting from the sleeve a set screw, screw threaded therein adapted to engage the flange, the end of the sleeve being laterally extended, and means for clamping the bumper support to such laterally extended end, said clamping means comprising a nut screw threaded on the end of the bolt adapted to compress the bumper support against the laterally extended end of the flange.

31. A clamp comprising a hook bolt adapted to inclose one flange of a frame member, a sleeve mounted for rotation thereon and having an eccentric frame engaging projection adapted when rotated to engage the flange to clamp the opposed arm of the bolt against the opposed side thereof and means for rotating the sleeve, the end of the sleeve being laterally extended, and means for clamping the bumper support to such laterally extended end, said clamping means comprising a nut screw threaded on the end of the bolt adapted to compress the bumper support against the laterally extended end of the flange, and means associated with the sleeve for preventing lateral movement thereof along the bolt when such tightening takes place.

32. A clamp comprising a hook bolt adapted to inclose one flange of a frame member, a sleeve mounted for rotation thereon and having an eccentric frame engaging projection adapted when rotated to engage the flange to clamp the opposed arm of the bolt against the opposed side thereof, and means for rotating the sleeve said means comprising an arm projecting from the sleeve a set screw, screw threaded therein adapted to engage the flange, the end of the sleeve being laterally extended, and means for clamping the bumper support to such laterally extended end, said clamping means comprising a nut screw threaded on the end of the bolt adapted to compress the bumper support against the laterally extended end of the flange, and means associated with the sleeve for preventing lateral movement thereof along the bolt when such tightening takes place.

33. A clamp comprising a hook bolt adapted to inclose one flange of a frame member, a sleeve mounted for rotation thereon and having an eccentric frame engaging projection adapted when rotated to engage the flange to clamp the opposed arm of the bolt against the opposed side thereof and means for rotating the sleeve, the end of the sleeve being laterally extended, and means for clamping the bumper support to such laterally extended end, said clamping means comprising an arm extending outwardly from the sleeve and means for adjustably mounting the bumper support on said arm.

34. A clamp comprising a hook bolt adapted to inclose the edge of a frame member, a sleeve mounted for rotation thereon and having an eccentric frame engaging projection adapted when rotated to engage the frame to clamp the opposed arm of the bolt against the opposed side thereof, and means for rotating the sleeve said means comprising an arm projecting from the sleeve, a set screw, screw threaded therein adapted to engage the frame, the end of the sleeve being laterally extended, and means for clamping the bumper support to such laterally extended end, said clamping means comprising an arm extending outwardly from the sleeve and means for adjustably mounting the bumper support on said arm.

35. A clamp comprising a hook bolt adapted to inclose the edge of a frame member, a sleeve mounted for rotation thereon and having an eccentric frame engaging projection adapted when rotated to engage the frame to clamp the opposed arm of the bolt against the opposed side thereof and means for rotating the sleeve, the end of the sleeve being laterally extended, and means for clamping the bumper support to such laterally extended end, said clamping means comprising an arm extending outwardly from the sleeve and means for adjustably mounting the bumper support on said arm, said arm being slotted, the bumper support holding means being adjustable within said slot.

36. A clamp comprising a hook bolt adapted to inclose the edge of a frame member, a sleeve mounted for rotation thereon and having an eccentric frame engaging projection adapted when rotated to engage the frame to clamp the opposed arm of the bolt against the opposed side thereof, and means for rotating the sleeve said means comprising an arm projecting from the sleeve, a set screw, screw threaded therein adapted to engage the frame, the end of the sleeve being laterally extended, and means for clamping the bumper support to such laterally extended end, said clamping means comprising an arm extending outwardly from the sleeve and means for adjustably mounting the bumper support on said arm, said arm being slotted, the bumper support holding means being adjustable within said slot.

37. A clamp comprising a hook bolt adapted to inclose one flange of a frame member, a sleeve mounted for rotation thereon and having an eccentric frame engaging projection adapted when rotated to engage the flange to clamp the opposed arm of the bolt against the opposed side thereof and means for rotating the sleeve, and means for limiting the longitudinal movement of the sleeve with respect to the bolt.

38. A clamp comprising a hook bolt adapted to inclose one flange of a frame member, a sleeve mounted for rotation thereon and having an eccentric frame engaging projection adapted when rotated to engage the flange to clamp the opposed arm of the bolt against the opposed side thereof, and means for rotating the sleeve, and means associated with said sleeve and independent of the clamping action of the sleeve and bolt for supporting a bumper on said sleeve.

39. A clamp comprising a hook bolt adapted to inclose one flange of a frame member, a sleeve mounted for rotation thereon and having an eccentric frame engaging projection adapted when rotated to engage the flange to clamp the opposed arm of the bolt against the opposed side thereof, and means for rotating the sleeve, said means comprising an arm projecting from the sleeve, a set screw, screw threaded therein adapted to engage the flange, and means associated with said sleeve and independent of the clamping action of the sleeve and bolt for supporting a bumper on said sleeve.

40. In an automobile bumper, a clamp adapted to be attached to the automobile frame, a flange thereon having a curved slot therein, bumper supporting bar in engagement with the flange and a bolt passing through the bar and the slot to hold them together.

41. In an automobile bumper, a bumper supporting bar adapted to project forward from the automobile frame, a pair of separate clamping members adapted to engage the automobile frame, a shank projecting from one of them passing through the supporting bar and means for clamping the bar on the shank member projecting laterally from the other and means for fastening the bar thereon.

42. In an automobile bumper, a bumper supporting bar adapted to project forward from the automobile frame, a pair of separate clamping members adapted to engage the automobile frame, a shank projecting from one of them passing through the supporting bar and means for clamping the bar on the shank member projecting laterally from the other and means for fastening the bar thereon, the means for fastening the bar on the shank of the clamp being independent of the clamping action thereof.

43. In an automobile bumper, a bumper supporting bar adapted to project forward from the automobile frame, a pair of separate clamping members adapted to engage the automobile frame, a shank projecting from one of them passing through the supporting bar and means for clamping the bar on the shank member projecting laterally from the other and means for fastening the bar thereon, the means for fastening the bar to the projection being independent of the clamping action of the clamp.

44. In an automobile bumper, a bumper supporting bar adapted to project forward from the automobile frame, a pair of separate clamping members adapted to engage the automobile frame, a shank projecting from one of them passing through the supporting bar and means for clamping the bar on the shank member projecting laterally from the other and means for fastening the bar thereon, the means for fastening the bar on the shank of the clamp being independent of the clamping action thereof, the means for fastening the bar to the projection being independent of the clamping action of the clamp.

45. In an automobile bumper a clamp adapted to be fastened on the frame and having a lateral projection with curved slot therein, a bumper supporting bar, a holding member passing through it and through the slot, the member being held against movement with respect to the bar, a second clamp adapted to engage the frame and having a member passing through and held against movement with respect to the bar.

46. In an automobile bumper a clamp adapted to be fastened on the frame and having a lateral projection with curved slot therein, a bumper supporting bar, a holding member passing through it and through the slot, the member being held against movement with respect to the bar, a second clamp adapted to engage the frame and having a member passing through and held against movement with respect to the bar, the two members being separately movable with respect to the automobile frame.

47. A clamp for automobile bumpers and the like comprising a perpendicular shaft member, a sleeve rotatable thereon, means for rotating said sleeve to clamp the member in position, a flange projecting from the sleeve and a curved slot therein.

In testimony whereof I affix my signature in the presence of two witnesses this 29 day of October, 1919.

LEWIS P. HALLADAY.

Witnesses:
GEORGE G. HOOD,
W. J. HEINCKE.